United States Patent

[11] 3,632,302

[72] Inventors Roland Entschel, Basle;
Viktor Kaeppeli, Allschwil/Basel; Curt Mueller, Binningen/Basel, all of Switzerland
[21] Appl. No. 833,185
[22] Filed June 13, 1969
[45] Patented Jan. 4, 1972
[73] Assignee Sandoz Ltd. (a/k/a Sandoz A.G.) Basle, Switzerland
[32] Priority May 13, 1969
[33] Switzerland
[31] 7282/69

[54] PROCESS FOR DYEING OR PRINTING TEXTILE MATERIALS WHICH CONSIST OF ACRYLONITRILE POLYMERS
11 Claims, No Drawings

[52] U.S. Cl. ................................................. 8/177 AB
[51] Int. Cl. ................................................. D06p 3/70
[50] Field of Search ....................................... 8/177, 177 AB

[56] References Cited
FOREIGN PATENTS

| 1,188,943 | 9/1959 | France | 8/177 AB |
| 13,748 | 8/1966 | Japan | 8/177 AB |

Primary Examiner—George F. Lesmes
Assistant Examiner—T. J. Herbert
Attorney—Littlepage, Quaintance, Wray & Aisenberg ABSTRACT: A process for dyeing polyacrylonitrile with cycloimmonium dyes of the styryl series containing one carboxylic acid, e.g. of the formula

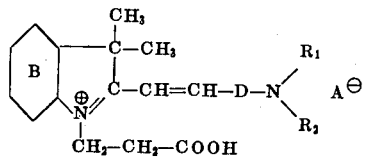

wherein $R_1$ and $R_2$ represent hydrogen or a hydrocarbon radical and $A^\ominus$ represents an anion and wherein the ring B and/or D may bear further non-water-solubilising substituents.

PROCESS FOR DYEING OR PRINTING TEXTILE MATERIALS WHICH CONSIST OF ACRYLONITRILE POLYMERS

The invention relates to a process for dyeing, padding or printing textile material, which consists of or contains acrylonitrile polymers or copolymers, with cycloimmonium dyestuffs of the styryl series and containing carboxyl groups. For this purpose, dyestuffs of the formula

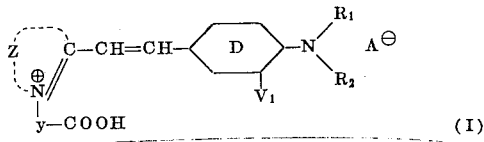

and free from sulfonic acid groups are used, wherein

Z represents the atoms necessary for supplementing an optionally substituted ring, y represents a straight-chain or branched, optionally substituted alkylene radical, with for example one to six and advantageously one to four carbon atoms, $R_1$ and $R_2$ respectively, represent hydrogen or an optionally substituted hydrocarbon radical, $V_1$ represents hydrogen or, in conjunction with $R_1$ or $R_2$, a constituent of a heterocycle, and $A^\ominus$ represents an anion, it being possible for the aromatic ring D to be substituted by other nonwater-solubilizing substituents, the radicals $R_1$ and $R_2$, together with the adjacent nitrogen atom, being able to form a heterocycle and the dyestuffs of the formula (I) carrying a —COOH group.

Particularly good dyeing effects are obtained if dyestuffs of the formula

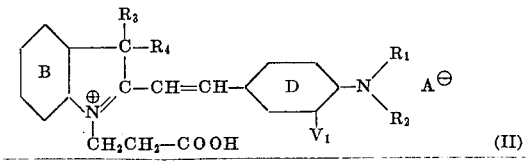

or more especially of the formula

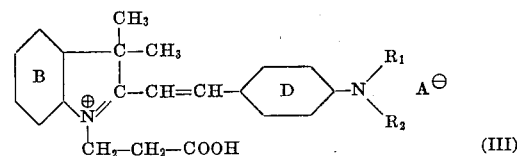

are used, wherein $R_3$ and $R_4$ respectively, represent an optionally substituted hydrocarbon radical, it being possible for the aromatic rings B and/or D to be further substituted by nonwater-solubilizing substituents and the dyestuffs of the formulas (II) and (III) to carry a —COOH group.

The dyestuffs of the formula (I) are known from French Pat. No. 1,188,943 in connection with photographic preparations. It was surprising that the dyestuffs of the formula (I), when dyed on polyacrylonitrile, produce outstanding level and genuine dyeing effects and have an outstanding fastness to steaming and boiling. The light fastness and the other wet-proof properties are also good, such as fastness to washing, perspiration, sublimation, creasing, hot-pressing, ironing, water, sea water, dry cleaning, over dyeing and solvents.

The dyestuffs of the formula (I) also serve for the dyeing, padding and printing of synthetic polyamides or synthetic polyesters, which are modified by acid groups. Such polyamides are, for example, known from Belgian Pat. No. 706,104. The corresponding polyesters are known from U.S. Pat Nos. 2,893,816, 3,018,272 or 3,379,723 or from Belgian Pat. No. 549,179.

Acrylonitrile copolymers are generally copolymers of 80-95 percent of acrylonitrile and 20-5 percent of vinyl acetate, vinyl pyridine, vinyl chloride, vinylidene chloride, acrylic acid, acrylate, methacrylic acid, methacrylates.

The dyeing advantageously takes place in water, it being recommended to operate in neutral or acid medium and at temperatures from 50° or 60 °C. up to the boiling point. Dyeing can also take place at temperatures above 100°C. under pressure in a closed vessel. The dyestuffs can be used, either dissolved in water or as a dispersion. Very level dyeing effects are also obtained without using retarders.

Furthermore, mixed fabrics which contain a proportion of polyacrylonitrile fibers can also be very satisfactorily dyed.

The dyestuffs of the formula (I) can be used individually or in admixture, for example, also with other cationic dyestuffs.

In the compounds of the formulas (I), (II) and (III), the anion $A^\ominus$ can be replaced by other anions, for example, by means of an ion exchanger or by reaction with salts or acids, optionally in several stages, for example, by way of the hydroxide or the bicarbonate.

By anion $A^\ominus$, there are to be understood both organic and inorganic ions, such as halogen ions, for example, chloride, bromide or iodide, sulfate; disulfate; methyl sulfate; amino sulfonate; perchlorate; carbonate; bicarbonate; phosphate; phosphomolybdate; phosphotungstate; phosphotungstomolybdate; benzene-sulfonate; naphthalene sulfonate; 4-chlorobenzene-sulfonate; oxalate; maleinate; acetate; propionate; lactate; succinate; chloracetate; tartrate; methane-sulfonate or benzoate ions; or complete anions, such as that of chlorine-zinc double salts.

By halogen, chlorine, bromine or fluorine is to be understood in every case. Hydrocarbon radicals are, for example, optionally substituted alkyl radicals, such as cycloalkyl radicals or optionally substituted aryl radicals, e.g. cyclohexyl, alkyl cyclohexyl or phenyl or naphthyl radicals. Alkyl or alkylene radicals, e.g. straight-chain or branched alkyl or alkylene radicals, usually contain one to 12 or one to six and, advantageously, one, two, three or four carbon atoms. If these radicals are substituted, they contain more especially halogen atoms, hydroxyl groups or cyanogen groups or aryl radicals, such as phenyl radicals; in such cases, alkyl stands for an aralkyl radical, e.g. a benzyl radical. Alkoxy radicals contain for example one to six and, advantageously, one, two or three carbon atoms.

All radicals of aromatic character, e.g. aromatic-carbocyclic rings B and/or D or aromatic heterocyclic radicals, such as the indicated ring in the formula (I) with the symbol Z, e.g. phenyl, naphthyl or tetrahydronaphthyl, or pyridyl, quinolyl or tetrahydroquinolyl radicals, can carry substituents, more especially nonwater-solubilizing substituents, e.g. halogen atoms, nitro, amino, cyanogen, thiocyanogen, hydroxyl, alkyl, alkoxy, trifluoralkyl, trichloralkyl, phenyl, phenyloxy, alkylamino, diakylamino, phenylamino, acyl, acyloxy, acylamino, such as urethane, alkyl-sulfonyl, aryl-sulfonyl, sulfonic acid amide, alkyl-sulfonic acid amide, dialkyl-sulfonic acid amide, aryl-sulfonic acid amide groups, arylazo, e.g. phenylazo, diphenylazo, naphthylazo, etc.

The radicals $R_1$ and $R_2$ are able in conjunction with the adjacent nitrogen atom to form a heterocycle, e.g. a pyrrolidine, piperazine, morpholine or piperidine ring.

In the formula (I), heterocyclic radicals or the indicated ring of the formula

can stand for optionally substituted multimembered and advantageously five-membered or six-membered rings, on which can optionally be condensed other cycloaliphatic, heterocyclic or aromatic rings, for example, for a pyridine, quinoline, pyrrolidine, isoquinoline, tetrahydroquinoline, pyrazole, triazole, pyridazine, imidazole, benzimidazole, pyrimidine, thiazole, benzthiazole, thiadiazole, indazole, pyrrole, indole, oxazole, isoxazole, pyrazoline or tetrazole ring, etc.

In the following examples, the parts represent parts by weight and the percentages represent percentages by weight, while the temperatures are indicated in degrees centigrade.

EXAMPLE 1

One part of the dyestuff of the formula

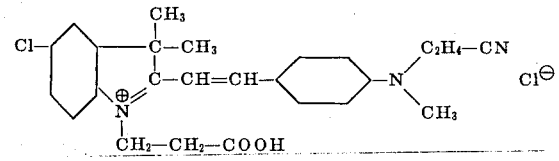

is formed into a paste with 1 part of 40 percent acetic acid, 400 parts of distilled water at 60° are poured over the paste while constantly shaking and the mixture is boiled for a short time. Dilution is effected with 7,600 parts of distilled water, 2 parts of glacial acetic acid are added and the substance is transferred at 60° with 100 parts of polyacrylonitrile into the dye bath. The material was treated beforehand for 15 minutes at 60° in a bath of 8,000 parts of water and 2 parts of glacial acetic acid. Heating takes place within 30 minutes to 100°, and boiling is carried out for 1 hour, followed by rinsing. A level pink dyeing effect of outstanding light fastness and wet-proof properties is obtained.

The dyestuff used can be obtained if 5-chloro-2,3,3-trimethylindolenine is condensed with N-cyanethyl-N-methyl-p-aminobenzaldehyde, using known methods and in acid medium, and the compound thus obtained is quaternized by known methods with acrylic acid.

EXAMPLE 1a

A water padding paste is composed of:
50 g./liter of dyestuff (corresponding to the dye preparation produced in the preceding example),
3 g./liter of sodium alginate,
5 g./liter of glacial acetic acid,
20 g./liter of a cation-active plasticizer, for example, a condensation product of 1 mol of stearic acid and 1 mol of triethanolamine,
25 g./liter of sodium sulphate.

Polyacrylonitrile fibers are padded in the cold, using the usual methods and on a two-roll or three-roll padding machine and with a wringing effect of 80 percent. After brief intermediate drying at 90° in the tentering frame, hot flue or by means of an infrared radiator, fixing is carried out in the nozzle tentering frame at 170°-190 °for 1 to 3 minutes with dry air, whereafter the fibers are rinsed and soaped and once again rinsed. A pink dyeing with good fastness properties is obtained.

EXAMPLE 1b

A printing paste is prepared as follows:
75 parts of dyestuff (corresponding to the dye preparation produced in example 1),
10 parts of glacial acetic acid,
450 parts of sodium alginate,
25 parts of a cation-active plasticizer, for example, a condensation product of 1 mol of stearic acid and 1 mol of triethanolamine,
25 parts of sodium sulfate,
415 parts of water
1000 parts Polyacrylonitrile fibers are printed, using the conventional hand-printing method, whereafter they are dried in air, steamed in a steaming device with saturated steam for 20-30 minutes, rinsed, soaped and once again rinsed.

A pink print with good fastness properties is obtained.

Using the same methods and with similarly good properties, the dyestuffs of which the structural composition is set out in the following table can be used for dyeing, padding or printing.

They correspond to the formula

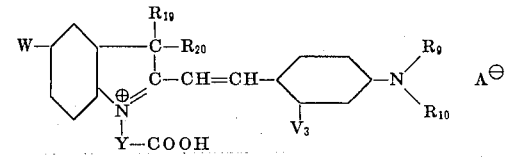

in which the symbols $R_9$, $R_{10}$, $R_{19}$, $R_{20}$, $V_3$, W and Y have the meanings indicated in the table.

As anion $A^\ominus$, there are to be considered those given in the specification.

TABLE

| Example Number | Y | $R_9$ | $R_{10}$ | $R_{19}$ | $R_{20}$ | W | $V_3$ | Shade of the dyeing on polyacrylo-nitrile |
|---|---|---|---|---|---|---|---|---|
| 2 | —CH₂CH₂— | —CH₃ | —CH₃ | —CH₃ | —CH₃ | H | H | Pink. |
| 3 | —CH₂CH₂— | —C₂H₅ | —C₂H₅ | —CH₃ | —CH₃ | H | H | Do. |
| 4 | —CH₂CH₂— | —C₂H₄—CN | —CH₃ | —CH₃ | —CH₃ | H | H | Do. |
| 5 | —CH₂CH₂— | —C₂H₄—CN | —C₂H₅ | —CH₃ | —CH₃ | H | H | Do. |
| 6 | —CH₂CH₂— | —C₂H₄—Cl | —C₂H₅ | —CH₃ | —CH₃ | H | H | Do. |
| 7 | —CH₂CH₂— | —C₂H₄—CN | —C₂H₄—CN | —CH₃ | —CH₃ | H | H | Scarlet. |
| 8 | —CH₂CH₂— | —C₂H₄—Cl | —C₂H₄—Cl | —CH₃ | —CH₃ | H | H | Pink. |
| 9 | —CH₂CH₂— | —C₆H₅ | —CH₃ | —CH₃ | —CH₃ | H | H | Do. |
| 10 | —CH₂CH₂— | —C₆H₄—p—OCH₃ | —CH₃ | —CH₃ | —CH₃ | H | H | Reddish violet. |
| 11 | —CH₂CH₂— | —CH₃ | —CH₃ | —CH₃ | —CH₃ | H | —CH₃ | Pink. |
| 12 | —CH₂CH₂— | —C₂H₅ | —C₂H₅ | —CH₃ | —CH₃ | H | —CH₃ | Do. |
| 13 | —CH₂CH₂— | —C₂H₄CN | —CH₃ | —CH₃ | —CH₃ | H | —CH₃ | Do. |
| 14 | —CH₂CH₂— | —C₂H₄CN | —C₂H₅ | —CH₃ | —CH₃ | H | —CH₃ | Do. |
| 15 | —CH₂CH₂— | —C₂H₄Cl | —C₂H₅ | —CH₃ | —CH₃ | H | —CH₃ | Do. |
| 16 | —CH₂CH₂— | —C₂H₄CN | —C₂H₄CN | —CH₃ | —CH₃ | H | —CH₃ | Do. |
| 17 | —CH₂CH₂— | —C₆H₅—p—OCH₃ | —CH₃ | —CH₃ | —CH₃ | H | —CH₃ | Reddish violet. |
| 18 | —CH₂CH₂— | —CH₃ | —CH₃ | —CH₃ | —CH₃ | H | Cl | Pink. |
| 19 | —CH₂CH₂— | —C₂H₅ | —C₂H₅ | —CH₃ | —CH₃ | H | Cl | Do. |
| 20 | —CH₂CH₂— | —C₂H₄CN | —CH₃ | —CH₃ | —CH₃ | H | Cl | Do. |
| 21 | —CH₂CH₂— | —C₂H₄Cl | —CH₃ | —CH₃ | —CH₃ | H | Cl | Do. |
| 22 | —CH₂CH₂— | —C₂H₄CN | —CH₃ | —CH₃ | —CH₃ | H | Br | Do. |
| 23 | —CH₂CH₂— | —C₂H₄CN | —CH₃ | —CH₃ | —CH₃ | H | F | Do. |
| 24 | —CH₂CH₂— | —C₂H₅ | —C₂H₅ | —CH₃ | —CH₃ | H | OCH₃ | Do. |
| 25 | —CH₂—CH₂— | —C₂H₄CN | —C₂H₅ | —CH₃ | —CH₃ | H | OCH₃ | Do. |
| 26 | —CH₂—CH₂— | —C₂H₄CN | —CH₃ | —CH₃ | —CH₃ | H | OCH₃ | Do. |
| 27 | —CH₂—CH₂— | —C₂H₄CN | —CH₃ | —CH₃ | —CH₃ | H | —C₂H₅ | Do. |
| 28 | —CH₂—CH₂— | —CH₃ | —CH₃ | —CH₃ | —CH₃ | Cl | H | Do. |
| 29 | —CH₂—CH₂— | —C₂H₅ | —C₂H₅ | —CH₃ | —CH₃ | Cl | H | Do. |
| 30 | —CH₂—CH₂— | —C₂H₄—CN | —C₂H₅ | —CH₃ | —CH₃ | Cl | H | Do. |
| 31 | —CH₂—CH₂— | —C₂H₄—CN | —C₂H₄CN | —CH₃ | —CH₃ | Cl | H | Scarlet. |
| 32 | —CH₂—CH₂— | —C₂H₄—Cl | —C₂H₅ | —CH₃ | —CH₃ | Cl | H | Pink. |

| Example Number | Y | $R_9$ | $R_{10}$ | $R_{19}$ | $R_{20}$ | W | $V_3$ | Shade of the dyeing on polyacrylonitrile |
|---|---|---|---|---|---|---|---|---|
| 33 | —CH₂—CH₂— | —C₂H₄—Cl | —C₂H₄—Cl | —CH₃ | —CH₃ | Cl | H | Do. |
| 34 | —CH₂—CH₂— | —C₆H₅—p—OCH₃ | —CH₃ | —CH₃ | —CH₃ | Cl | H | Violet. |
| 35 | —CH₂—CH₂— | —C₂H₅ | —C₂H₅ | —CH₃ | —CH₃ | Cl | —CH₃ | Pink. |
| 36 | —CH₂—CH₂— | —C₂H₄—CN | —CH₃ | —CH₃ | —CH₃ | Cl | —CH₃ | Do. |
| 37 | —CH₂—CH₂— | —C₂H₄CN | —C₂H₅ | —CH₃ | —CH₃ | Cl | —CH₃ | Do. |
| 38 | —CH₂—CH₂— | —C₂H₄Cl | —C₂H₅ | —CH₃ | —CH₃ | Cl | —CH₃ | Do. |
| 39 | —CH₂—CH₂— | —C₂H₄Cl | —C₂H₄Cl | —CH₃ | —CH₃ | Cl | —CH₃ | Do. |
| 40 | —CH₂—CH₂— | —CH₃ | —CH₃ | —CH₃ | —CH₃ | Cl | Cl | Do. |
| 41 | —CH₂—CH₂— | —C₂H₄CN | —CH₃ | —CH₃ | —CH₃ | Cl | Cl | Do. |
| 42 | —CH₂—CH₂— | —C₂H₄Cl | —C₂H₅ | —CH₃ | —CH₃ | Cl | Cl | Do. |
| 43 | —CH₂—CH₂— | —C₂H₄CN | —C₂H₄CN | —CH₃ | —CH₃ | Cl | Cl | Do. |
| 44 | —CH₂—CH₂— | —C₂H₄CN | —CH₃ | —CH₃ | —CH₃ | Cl | Br | Do. |
| 45 | —CH₂—CH₂— | —C₂H₄CN | —CH₃ | —CH₃ | —CH₃ | Cl | OCH₃ | Do. |
| 46 | —CH₂—CH₂— | —C₂H₄Cl | —C₂H₅ | —CH₃ | —CH₃ | Cl | OCH₃ | Do. |
| 47 | —CH₂—CH₂— | —C₂H₅ | —C₂H₅ | —CH₃ | —CH₃ | Br | H | Do. |
| 48 | —CH₂—CH₂— | —C₂H₄CN | —CH₃ | —CH₃ | —CH₃ | F | H | Do. |
| 49 | —CH₂—CH₂— | —C₂H₄CN | —CH₃ | —CH₃ | —CH₃ | OCH₃ | H | Do. |
| 50 | —CH₂—CH₂— | —C₂H₅ | —C₂H₅ | —CH₃ | —CH₃ | OCH₃ | H | Do. |
| 51 | —CH₂—CH₂— | —C₂H₄Cl | —C₂H₅ | —CH₃ | —CH₃ | OCH₃ | H | Do. |
| 52 | —CH₂—CH₂— | —CH₃ | —CH₃ | —CH₃ | —CH₃ | —SO₂N(CH₃)₂ | H | Do. |
| 53 | —CH₂—CH₂— | —C₂H₄CN | —CH₃ | —CH₃ | —CH₃ | —SO₂N(CH₃)₂ | H | Do. |
| 54 | —CH₂—CH₂— | —C₂H₅ | —C₂H₅ | —CH₃ | —CH₃ | —CON(CH₃)₂ | H | Do. |
| 55 | —CH₂—CH₂— | —C₂H₄CN | —CH₃ | —CH₃ | —CH₃ | —CON(CH₃)₂ | H | Do. |
| 56 | —CH₂—CH₂— | —C₂H₄Cl | —C₂H₅ | —CH₃ | —CH₃ | —CON(CH₃)₂ | H | Do. |
| 57 | —CH₂—CH₂— | —C₂H₄CN | —C₂H₅ | —CH₃ | —CH₃ | —SO₂N(CH₃)₂ | —CH₃ | Do. |
| 58 | —CH₂—CH₂— | —C₂H₄CN | —C₂H₅ | —CH₃ | —CH₃ | —CON(CH₃)₂ | —CH₃ | Do. |
| 59 | —CH₂— | —CH₃ | —C₂H₅ | —CH₃ | —CH₃ | H | H | Do. |
| 60 | —CH₂— | —C₂H₅ | —C₂H₅ | —CH₃ | —CH₃ | H | H | Do. |
| 61 | —CH₂— | —C₂H₄CN | —C₂H₅ | —CH₃ | —CH₃ | H | —CH₃ | Do. |
| 62 | —CH₂— | —C₂H₄Cl | —C₂H₅ | —CH₃ | —CH₃ | H | H | Do. |
| 63 | —CH₂— | —C₂H₄CN | —C₂H₄CN | —CH₃ | —CH₃ | H | H | Scarlet. |
| 64 | —CH₂—CH₂— | —CH₃ | —CH₃ | —C₂H₅ | —C₂H₅ | H | H | Pink. |
| 65 | —CH₂—CH₂— | —C₂H₄CN | —CH₃ | —C₂H₅ | —C₂H₅ | H | H | Do. |
| 66 | —CH₂—CH₂— | —C₂H₄Cl | —C₂H₅ | —C₂H₅ | —C₂H₅ | H | H | Do. |
| 67 | —CH₂—CH₂— | —C₂H₄CN | —CH₃ | —C₂H₅ | —CH₃ | H | H | Do. |

EXAMPLE 69

Using the dyestuff of the formula

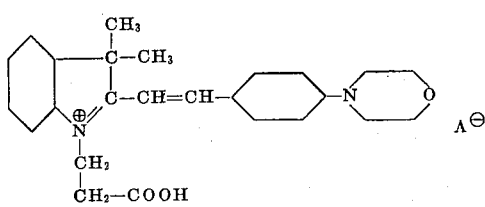

a pink dyeing is obtained on polyacrylonitrile. Formulas of representative dyes of the foregoing examples are as follows:

EXAMPLE 1

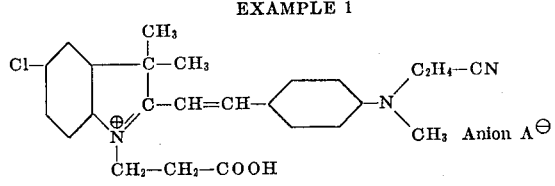

EXAMPLE 3

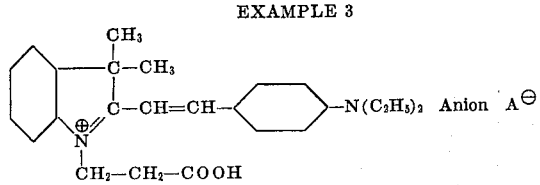

EXAMPLE 5

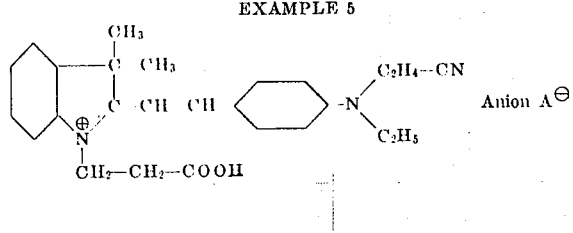

EXAMPLE 10

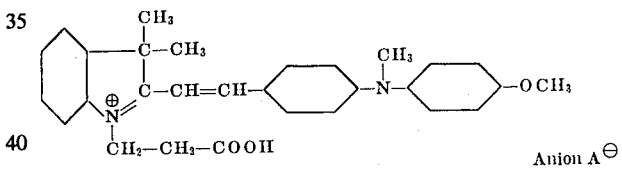

EXAMPLE 37

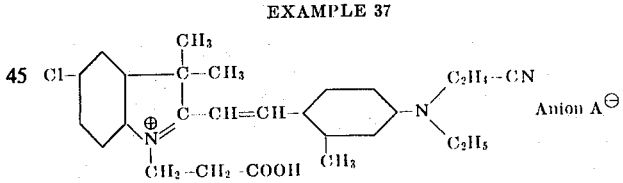

Having thus disclosed the invention, what we claim is:

1. A process for dyeing, padding or printing textile material with a carboxyl-group-containing cycloimmonium dye of the styryl series, the textile material consisting of or containing acrylonitrile polymer or copolymer and the cycloimmonium dye being free from sulfonic acid groups and of the formula

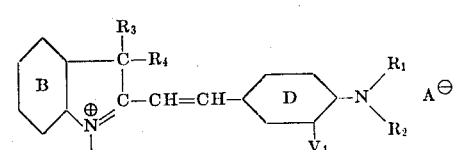

wherein y is substituted or unsubstituted alkylene having from one to six carbon atoms, any substituent of substituted alkylene being halo, hydroxy, cyano or aryl;

each of $R_1$ and $R_2$ is, independently, hydrogen or a substituted or unsubstituted member selected from the group consisting of alkyl, cycloalkyl and aryl;

or $R_1$ and $R_2$, together with the nitrogen atom to which both are bound, form a heterocycle;

each of $R_3$ and $R_4$ is independently, a substituted or unsubstituted member selected from the group consisting of alkyl, cycloalkyl, phenyl and naphthyl; any substituent on a substituted alkyl or cycloalkyl being halo, hydroxy, cyano or phenyl; any substituent on a substituted phenyl or naphthyl being halo, nitro, amino, cyano, thiocyano, hydroxy, alkyl, alkoxy, trifluoroalkyl, trichloroalkyl, phenyl, phenoxy, alkylamino, dialkylamino, phenylamino, acyl, acyloxy, acylamino, alkyl-sulfonyl, aryl-sulfonyl, sulfonic acid amide, alkyl-sulfonic acid amide, dialkyl-sulfonic acid amide, aryl-sulfonic acid amide or arylazo; each alkyl having from one to 12 carbon atoms; and each aryl being phenyl, diphenyl or naphthyl;

each of ring B and ring D is, independently, otherwise unsubstituted or further substituted, any further substituent on either ring being a nonwater-solubilizing substituent selected from the group consisting of halo, nitro, amino, cyano, thiocyano, hydroxy, alkyl, alkoxy, trifluoroalkyl, trichloroalkyl, phenyl, phenoxy, alkylamino, dialkylamino, phenylamino, acyl, acyloxy, acylamino, alkyl-sulfonyl, aryl-sulfonyl, sulfonic acid amide, alkyl-sulfonic acid amide, dialkyl-sulfonic acid amide, aryl-sulfonic acid amide and arylazo; each alkyl having from one to 12 carbon atoms; and each aryl being phenyl, diphenyl or naphthyl;

$V_1$ is hydrogen;

or $V_1$ and $R_2$, together with the atoms to which they are bound, form a heterocycle; and $A^\ominus$ is an anion.

2. A process according to claim 1 for dyeing, padding or printing textile material with a carboxyl-group-containing cycloimmonium dye of the styryl series, the textile material consisting of or containing acrylonitrile polymer or copolymer and the cycloimmonium dye being free from sulfonic acid groups and of the formula

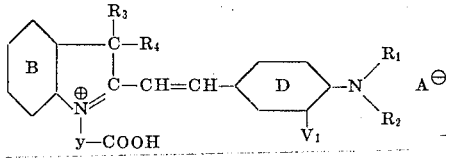

wherein y is substituted or unsubstituted alkylene having from one to six carbon atoms, any substituent of substituted alkylene being halo, hydroxy, cyano or aryl;

each of $R_1$ and $R_2$ is, independently, hydrogen or a substituted or unsubstituted member selected from the group consisting of alkyl, cycloalkyl and aryl; any substituent on a substituted alkyl or cycloalkyl being halo, hydroxy, cyano or aryl; any substituent on a substituted aryl being halo, nitro, amino, cyano, thiocyano, hydroxy, alkyl, alkoxy, trifluoroalkyl, trichloroalkyl, phenyl, phenoxy, alkylamino, dialkylamino, phenylamino, acyl, acyloxy, acylamino, alkyl-sulfonyl, aryl-sulfonyl, sulfonic acid amide, alkyl-sulfonic acid amide, dialkyl-sulfonic acid amide, aryl-sulfonic acid amide or arylazo, any alkyl of which has from one to 12 carbon atoms and any aryl of which is phenyl, diphenyl or naphthyl;

or $R_1$ and $R_2$, together with the nitrogen to which both are bound, form a heterocyclic ring selected from the group consisting of a pyrrolidine ring, a piperazine ring, a morpholine ring and a piperidine ring;

each of $R_3$ and $R_4$ is, independently, a substituted or unsubstituted member selected from the group consisting of alkyl, cycloalkyl, phenyl and naphthyl; any substituent on a substituted alkyl or cycloalkyl being halo, hydroxy, cyano or phenyl; any substituent on a substituted phenyl or naphthyl being halo, nitro, amino, cyano, thiocyano, hydroxy, alkyl, alkoxy, trifluoroalkyl, trichloroalkyl, phenyl, phenoxy, alkylamino, dialkylamino, phenylamino, acyl, acyloxy, acylamino, alkyl-sulfonyl, aryl-sulfonyl, sulfonic acid amide, alkyl-sulfonic acid amide, dialkyl-sulfonic acid amide, aryl-sulfonic acid amide or arylazo; each alkyl having from one to 12 carbon atoms; and each aryl being phenyl, diphenyl or naphthyl;

each of ring B and ring D is, independently, otherwise unsubstituted or further substituted, any further substituent on either ring being a nonwater-solubilizing substituent selected from the group consisting of halo, nitro, amino, cyano, thiocyano, hydroxy, alkyl, alkoxy, trifluoroalkyl, trichloroalkyl, phenyl, phenoxy, alkylamino, dialkylamino, phenylamino, acyl, acyloxy, acylamino, alkyl-sulfonyl, aryl-sulfonyl, sulfonic acid amide, alkyl-sulfonic acid amide, dialkyl-sulfonic acid amide, aryl-sulfonic acid amide and arylazo; each alkyl having from one to 12 carbon atoms; and each aryl being phenyl, diphenyl or naphthyl;

$V_1$ is hydrogen;

or $V_1$ and $R_2$, together with the atoms to which they are bound, form a heterocycle; and $A^\ominus$ is an anion.

3. A process according to claim 1 for dyeing, padding or printing textile material with a carboxyl-group-containing cycloimmonium dye of the styryl series, the textile material consisting of or containing acrylonitrile polymer or copolymer and the cycloimmonium dye being free from sulfonic acid groups and of the formula

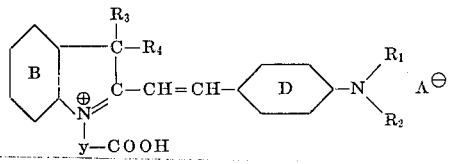

wherein $R_3$ is alkyl;

$R_4$ is alkyl;

y is alkylene;

$R_1$ is alkyl or alkyl substituted by a member selected from the group consisting of halo, cyano, phenyl and alkoxyphenyl;

$R_2$ is alkyl or alkyl substituted by a member selected from the group consisting of halo and cyano;

or $R_1$ and $R_2$, together with the nitrogen atom to which both are bound, form a morpholine ring;

ring D is otherwise unsubstituted or is further substituted by a member selected from the group consisting of halo, alkyl and alkoxy;

ring B is otherwise unsubstituted or is further substituted by a member selected from the group consisting of halo, alkoxy, dimethyl-sulfonic acid amide and dimethylcarboxylic acid amide;

$A^\ominus$ is an anion; each alkyl and alkylene has one, two, three or four carbon atoms; and each alkoxy has one, two or three carbon atoms.

4. A process according to claim 1 for dyeing, padding or printing textile material with a carboxyl-group-containing cycloimmonium dye of the styryl series, the textile material consisting of or containing acrylonitrile polymer or copolymer and the cycloimmonium dye being free from sulfonic acid groups and of the formula

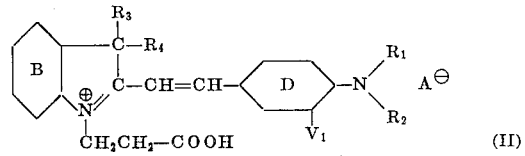

(II)

wherein each of $R_3$ and $R_4$ is, independently, a substituted or unsubstituted member selected from the group consisting of alkyl, cycloalkyl, phenyl and naphthyl; any substituent on a substituted alkyl or cycloalkyl being halo, hydroxy, cyano or phenyl; any substituent on a substituted phenyl or naphthyl being halo, nitro, amino, cyano, thiocyano, hydroxy, alkyl, alkoxy, trifluoroalkyl, trichloroalkyl, phenyl, phenoxy, alkylamino, dialkylamino, phenylamino, acyl, acyloxy, acylamino, alkylsulfonyl, aryl-sulfonyl, sulfonic acid amide, alkyl-sulfonic acid amide, dialkyl-sulfonic acid amide, aryl-sulfonic acid amide or arylazo; each alkyl having from one to 12 carbon atoms; and each aryl being phenyl, diphenyl or naphthyl;

each of ring B and ring D is, independently, otherwise unsubstituted or further substituted, any further substituent on either ring being a nonwater-solubilizing substituent selected from the group consisting of halo, nitro, amino, cyano, thiocyano, hydroxy, alkyl, alkoxy, trifluoroalkyl, trichloroalkyl, phenyl, phenoxy, alkylamino, dialkylamino, phenylamino, acyl, acyloxy, acylamino, alkylsulfonyl, aryl-sulfonyl, sulfonic acid amide, alkyl-sulfonic acid amide, dialkyl-sulfonic acid amide, aryl-sulfonic acid amide and arylazo; each alkyl having from one to 12 carbon atoms; and each aryl being phenyl, diphenyl or naphthyl;

$V_1$ is hydrogen;

or $V_1$ and $R_2$, together with the atoms to which they are bound, form a heterocycle; and $A^\ominus$ is an anion.

5. A process according to claim 4 wherein the dye is of the formula

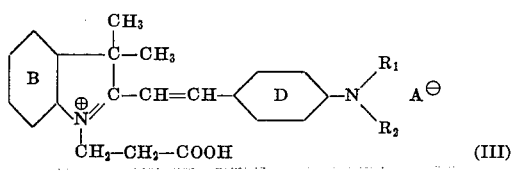

(III)

6. A process according to claim 4 wherein the dye is of the formula

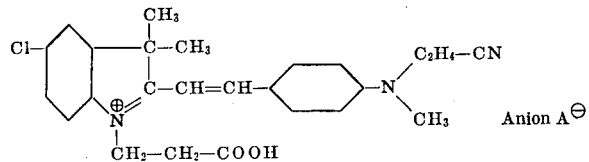

7. A process according to claim 4 wherein the dye is of the formula

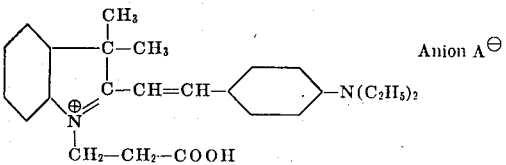

8. A process according to claim 4 wherein the dye is of the formula

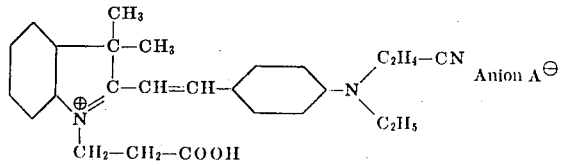

9. A process according to claim 4 wherein the dye is of the formula

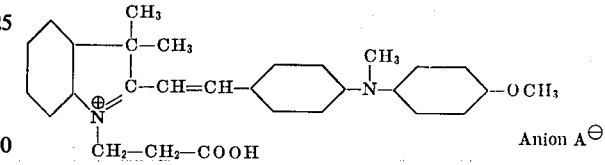

10. A process according to claim 4 wherein the dye is of the formula

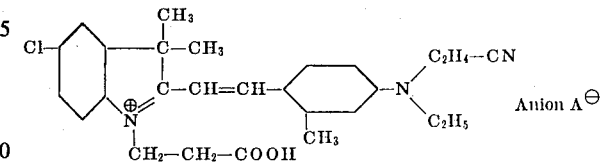

11. Textile material dyed in accordance with claim 1.

* * * * *